United States Patent [19]

Kambe et al.

[11] Patent Number: 4,943,418

[45] Date of Patent: Jul. 24, 1990

[54] METHOD OF PREPARING HIGH-PURITY MANGANESE COMPOUNDS

[75] Inventors: Koichi Kambe, Sakata; Kiyoshi Matsuura, Kiryu; Tatsuo Seino, Narashino; Yoshiyuki Kimura, Gunma; Hiroshi Kemmochi, Gunma; Koichi Yoshioka, Gunma; Hideaki Hohnoki, Gunma, all of Japan

[73] Assignee: Japan Metals & Chemicals Co., Ltd., Tokyo, Japan

[21] Appl. No.: 361,757

[22] Filed: May 30, 1989

Related U.S. Application Data

[63] Continuation of Ser. No. 137,333, Dec. 23, 1987, abandoned.

[30] Foreign Application Priority Data

Mar. 10, 1987 [JP] Japan .................................. 62-54872
Mar. 10, 1987 [JP] Japan .................................. 62-54871

[51] Int. Cl.$^5$ .......................................... C01G 45/00
[52] U.S. Cl. .......................................... 423/50; 423/49;
423/51; 423/52; 423/142; 423/143; 423/144;
423/146; 423/150; 423/419 R; 423/594;
423/599; 423/605; 423/632; 423/DIG. 4
[58] Field of Search ..................... 423/49-52,
423/142, 143, 144, 146, 150, 419 R, 605, 594, 599, 632, DIG. 4

[56] References Cited

U.S. PATENT DOCUMENTS

| | | | |
|---|---|---|---|
| 3,723,095 | 3/1973 | Skarbo | 75/119 |
| 3,734,715 | 5/1973 | Redman | 75/119 |
| 3,736,125 | 5/1973 | Wilder | 75/119 |
| 3,751,554 | 8/1973 | Bare et al. | 423/144 |
| 3,788,841 | 1/1974 | Agarwal et al. | 75/119 |
| 4,020,143 | 4/1977 | Lueders et al. | 423/DIG. 4 |
| 4,029,498 | 6/1977 | Okajima | 423/50 |
| 4,046,851 | 9/1977 | Subramanian et al. | 423/DIG. 4 |
| 4,065,542 | 12/1977 | Subramanian et al. | 423/DIG. 3 |
| 4,093,698 | 6/1978 | Cardwell et al. | 423/DIG. 4 |
| 4,137,291 | 1/1979 | Cardwell et al. | 423/DIG. 4 |
| 4,146,572 | 3/1979 | Cardwell et al. | 423/DIG. 4 |
| 4,208,379 | 6/1980 | Pahlman et al. | 423/DIG. 4 |
| 4,597,957 | 7/1986 | Oku et al. | 423/594 |
| 4,620,964 | 11/1986 | Pinto et al. | 423/50 |

Primary Examiner—Robert L. Stoll
Assistant Examiner—Paige C. Harvey
Attorney, Agent, or Firm—Oliff & Berridge

[57] ABSTRACT

In a method of preparing high-purity manganese compounds, wherein the method comprises adding a member selected from ferromanganese and metallic manganeses to an aqueous electrolyte-containing solution, dissolving said member while stirring and maintaining a pH of 2 to 9, and then removing insolubles by filtration and recovering solubles by precipitation, heavy metal elements as well as non-metllic elements, such as P, Si, etc. can be removed efficiently, and high-purity manganese compounds of stable quality can be prepared.

22 Claims, 3 Drawing Sheets

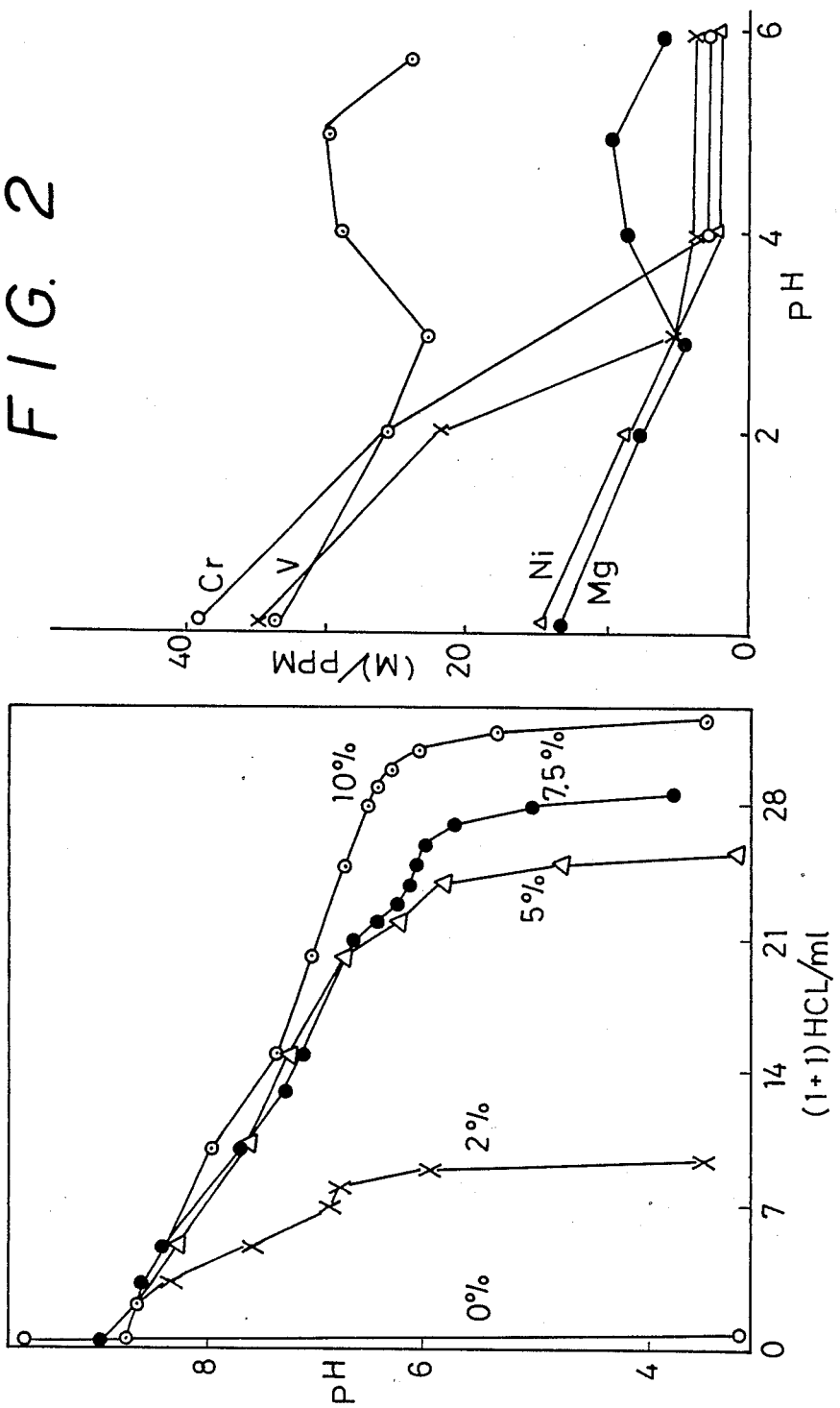

METHOD OF PREPARING HIGH-PURITY MANGANESE COMPOUNDS

This is a Continuation of application Ser. No. 17/137,333 filed Dec. 23, 1987 now abandoned.

BACKGROUND OF THE INVENTION

The present invention relates to a method of preparing high-purity manganese compounds, and more particularly relates to a method of preparing manganese compounds suitable for manganese ferrite raw materials.

Conventionally a method of preparing high-purity manganese compounds has been in use in which manganese ores are dissolved in sulfuric acid, heavy metals coexisting as impurities are separated and removed by the sulfide process, solvent extraction process or alcoholate process, irons are separated and removed in the form of hydroxides by means of oxidation, and then manganese is recovered in the form of various salts.

Recently, a method of purifying high-purity manganese compounds for preparation of high-purity manganese compounds is known in which ferromanganeses or metallic manganeses containing less impurities such as alkali metals than manganese ores, are dissolved directly by an acid, heavy metals and irons are separated and removed as in the conventional method described above, and then recrystallizing process is performed.

However, the conventional methods described above have disadvantages in that most of the impurities are dissolved concurrently with manganese, since the manganese is dissolved directly by acid treatment, so that not only several removing procedures thereof, but also a purifying procedure with complicated recrystallization are required, and in that the treatment efficiency is low and high-purity manganese can not always be obtained.

SUMMARY OF THE INVENTION

Therefore, one object of the present invention is to provide a method of preparing high-purity manganese compounds cheaply by removing not only heavy metal elements but also non-metallic elements such as P, Si, etc. efficiently, using simple procedures.

Another object of the present invention is to provide a method of preparing high-purity manganese compounds of constant quality used as raw materials for ferrites steadily.

In other words, the present invention has in essence claim 1 as the first embodiment, claim 8 as the second embodiment, and claim 15 as the third embodiment.

DESCRIPTION OF THE DRAWINGS

FIG. 1 shows the titration curve of the electrolytic solution;

FIGS. 2 and 3 show graphically the relationship of the impurities contents to pH respectively;

DESCRIPTION OF THE PREFERRED EMBODIMENTS

Figure 4:
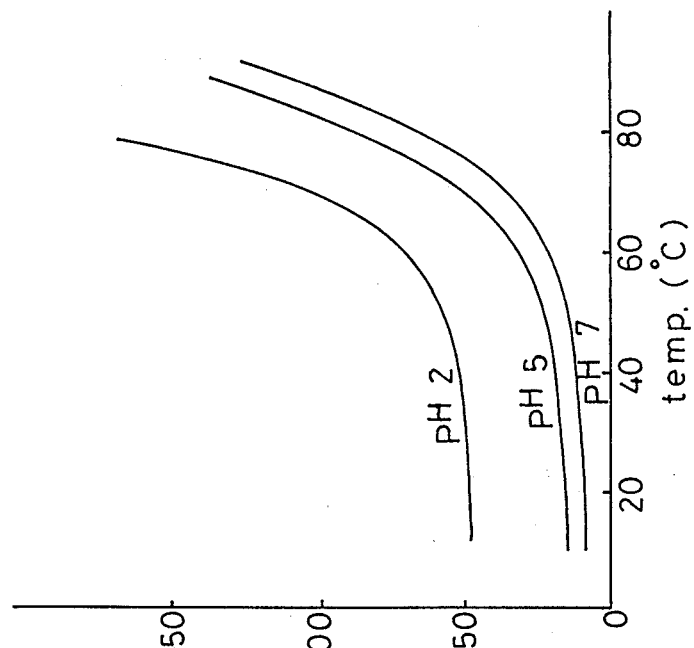
FIG. 4 shows graphically the relationship of the Co-content to temperature.

In the first embodiment of the present invention, a method of preparing high-purity manganese compounds comprises adding one or two members of ferromanganeses and metallic manganeses to an aqueous electrolyte-containing solution, dissolving the said one or two members of ferromanganeses and metallic manganeses by addition of an acid thereto while stirring and maintaining a pH of 2 to 9, separating insolubles by filtration, and recovering solubles after precipitation.

The electrolyte used in the present invention is one or more members selected from the group consisting of ammonium nitrate, ammonium acetate, salts of alkali metals, etc.

The manganese compounds of the present invention shall include mixtures of manganese compounds and ferrous metals as well as manganese compounds themselves.

The ferromanganeses and metallic manganeses used as raw materials in the present invention are ground (preferably to 60 mesh or less) and added to the electrolytic solution.

When the above-described ferrmanganese and metallic manganese are added to water, manganese and iron react with water, forming hydroxides, and the pH of the solution thereof rises nearly to 9.7. When the said ferromanganese and metallic manganese are added to the solution containing an electrolyte such as ammonium chloride etc. hydroxides are formed likewise by manganese and iron, but the pH of the solution drops by the buffering action of the said solution.

The degree to which pH drops depends on the concentration of the solution, and for the 2%-solution fo ammonium, the pH is for example at about 9.7, and for the 20%-solution thereof it is at about 7.8.

Since the pH-value at which manganese hydroxide (II) or iron hydroxide (II) precipitates completely is nearly equal to or more than 9 or 8 respectively, the formed manganese hydroxide and iron hydroxide are partially dissolved and the rest is in a precipitated condition, while the elements having a lower ionization tendency than manganese and iron, i.e. the heavy metal elements, remain unreacted.

When an acid is added to the mangnaese hydroxide and iron hydroxide formed as above, these are dissolved in the form of salts, and the heavy metal elements can be separated completely. The acid hereupon may be any of hydrochloric acid, sulfuric acid, acetic acid or nitric acid. As an example thereof FIG. 1 is explained below. FIG. 1 shows the variation in pH-values when ferromanganese powder is added to the electroyltic solution and hydrochloric acid is titrated thereto. In the aqueous solution which contains no electrolyte, pH drops rapidly by adding only a small amount of hydrochloric acid, so that the result is the same as in the conventional acid-dissolution. Therefore, the impurities in the ferromanganese must be separated by the conventional method because the whole amount thereof is dissolved.

On the other hand, in the electrolyte-containing solution, the variation in pH-values is smaller because of the buffering action of the electrolyte. And in this pH-range (the pH is at least 2 or more) non-reactants are not affected by an acid, and therefore remain wholly undissolved, and the impurities can be separated completely. As FIG. 1 shows, the higher the concentration of the electrolyte is, the larger the buffering action is which keeps the pH constant, and when the said concentration is 5% or more, little difference is observed in the buffering action.

Therefore, according to the present invention the electrolyte have preferably a concentration of 5% or more. As FIG. 2 shows, the heavy metals such as Cr, V, Ni, etc. exhibit a rapid decrease at the pH of 2 or more. In the present invention it is also noteworthy that the elements having a lower ionization tendency than manganese and iron, as well as the non-metallic elements can be removed.

Figure 3:
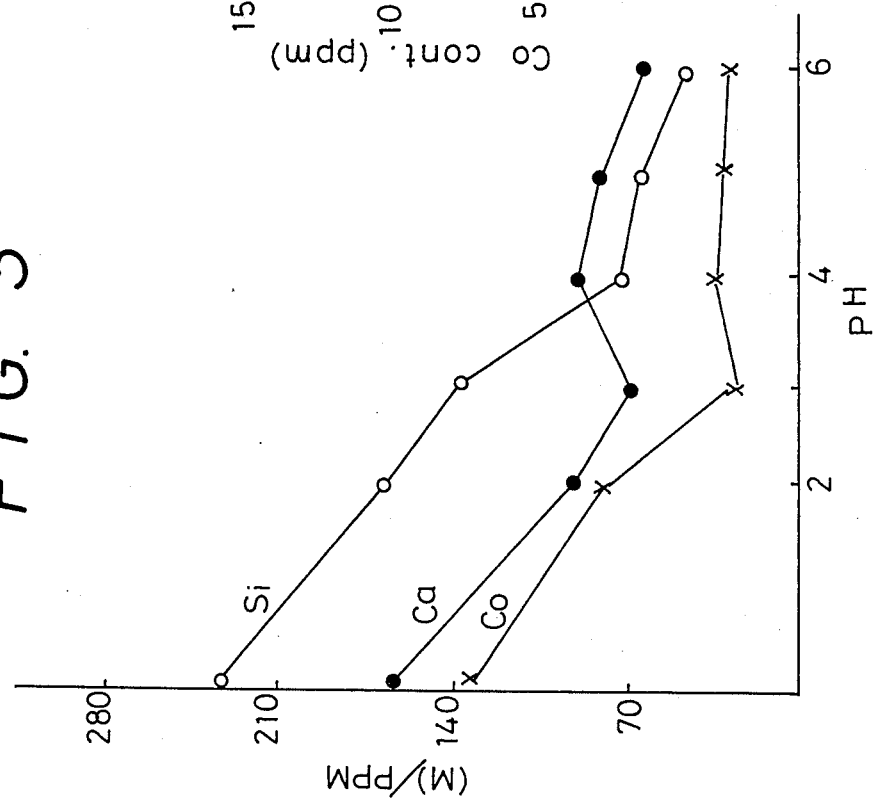

That is to say, as FIGS. 2 and 3 show, not only Mg and Ca but also non-metallic elements such as Si, P, etc. can be removed. These non-metallic elements may probably be adsorbed by non-reactants. P has no correlation with the extraction pH. But considering that the raw ferromanganese contains generally about 1400 ppm of P, P can be efficiently removed, irrespective of the extraction pH, at any pH-value. Although Co exhibits a higher value than Cr, V, Ni, etc. nearly the whole amount thereof can be removed by being reacted at the same pH of 2 or more as for Cr, V, Ni, etc. One probable explanation therefor is that Co forms amine complexes and that they are adsorbed by the non-reactants.

As FIGS. 2 and 3 show, according to the present invention, the impurities except manganese and iron can be removed and separated. And when a nitric acid compound is used as an electrolyte, or nitric acid as an acid, iron can also be separated. In other words, when an oxidic acid such as nitric acid is used, iron (II) hydroxide is oxidized to iron (III) hydroxide. Since the said iron (III) hydroxide is precipitated almost completely at a pH of 5.0 or more, it can be easily separated by its filtration together with the non-reactants. The same result is obtained by adding another oxidizing agent, for example hydrogen peroxide, or by blowing air.

According to the present invention, high-purity manganese compounds in the form of the mixture of managanese and iron or manganese itself can be therefore obtained by using an acid selected in accordance with the compositions required for producing ferrites.

After the dissolved and separated manganese and iron have been treated as described above, the Mn and Fe in the solution may be precipitated, separated and recovered in the form of carbonates, oxalates or hydroxides by conventional procedures, and then they can be sintered and recovered in the form of oxides, if necessary.

The obtained high-purity manganese compounds can be used as raw materials for ferrites.

As described above, the present invention has an advantage in that high-purity manganese compounds can be provided cheaply since not only the heavy metal elements but also the non-metallic elements such as Si, P, etc. in ferromanganeses and metallic manganeses can be removed efficiently, and since no expensive apparatus are required.

The second and third embodiments of the present invention are explained in detail below. In the present invention, heavy metals such as Cr, Co, Ni, etc. as well as impurities such as P, Si, Al, V, etc. especially Co, Ca, etc. whose dissolving rate is highly dependent on temperature, and P, Si, Al, etc. which are removed by being adsorbed by the non-reactants and precipitates in the reaction systems, are adapted to be removed nearly equally, so that high-purity manganese compounds of stable quality can be provided in a large amount.

In the second embodiment, a method of preparing high-purity manganese compounds comprises adding one or two members of ferromanganeses and metallic manganeses to an aqueous electrolyte-containing solution, dissolving the one or two members of ferromanganeses and metallic manganeses by the addition of an acid thereto while stirring and maintaining a pH of 2 to 9, separating insolubles by filtration, and recovering dissolved manganese and iron after precipitation. In the second embodiment the removal rates of impurities, especially those of Co and Ca, could be raised and kept nearly constant by maintaining reactions at a temperature of 20° to 60° C. in dissolving by the addition of an acid while stirring in the reaction system.

At a temperature of lower than 20° C. low dissolution reaction rates of manganese and iron are undesirable, and at a temperature of higher than 60° C. higher dissolution rates of Co, Ca, etc. make the removal rates thereof lower. Moreover, by maintaining a temperature of 20° to 60° C. as described above, the removal rates of impurities such as P, Al, V, etc. become also higher similarly to those of Co, Ca, etc. and vary only a little. In the third embodiment, air is blown into the reaction system of the second embodiment in the dissolving procedure. In the second embodiment, manganese compounds containing little impurities can be obtained by adding ferromanganese and metallic manganese to an aqueous electrolyte-containing solution, adding an acid while stirring, and then maintaining a temperature of 20° to 60° C. and a pH of 2 to 9. As for the third embodiment, the impurities can be decreased furthermore in combination with blowing air into the reaction system.

In other words, in adding ferromanganese and metallic manganese to an aqueous electrolyte-containing solution and adjusting the pH thereof to 2 to 9 by the addition of an acid at 20° to 60° C. while stirring, iron (II) hydroxide is oxidized to iron (III) hydroxide. This iron (III) hydroxide is precipitated easily at a lower pH-value than iron (II) hydroxide and almost completely in particular at a pH of more than 3. Therefore, if the lowest possible Fe-content is required in order to obtain high-purity manganese compounds, the pH-value of the said solution may be from 5 to 9. Since the precipitated iron (III) hydroxide adsorbs a minute amount of impurities such as P, Si, Al, Cr, etc. still remaining in the solution, the impurities content can be lowered remarkably, and therefore manganese compounds with less impurities than those of the second embodiment can be obtained.

As a result of the above-described procedures, only manganese and iron are substantially present in a dissolved and extracted state in the aqueous solution. In order to recover manganese and iron from the aqueous solution, the manganese and iron in the aqueous solution are precipitated for example in the form of carbonates. Then manganese compounds with very low impurities contents can be recovered. And by sintering the carbonates at 800° C., if necessary, high-purity oxides or manganese oxides containing manganese and iron can be easily obtained.

It is not always necessray to recover manganese compounds in the form of carbonates from the solution, if they can be easily precipitated and removed from the solution.

As described above, in embodiment 2, various impurities in the raw material can be easily removed, and in particular elements such as Co, Ca, etc. can be decreased steadily by adding ferromanganese and metallic manganese to an electrolytic solution while adjusting the pH as well as maintaining the temperature.

Embodiment 3 makes it possible to remove not only various impurities but also iron by using a simple procedure of blowing air in combination with embodiment 2, so that a wide variety of raw materials for ferrites can be provided.

In the following, embodiments 4 and 5 of the present invention will be described in detail.

In embodiment 4 of the present invention, a method of preparing high-purity manganese compounds comprises adding one or two member of ferromanganese and metallic manganese to an aqueous electrolyte-containing solution, dissolving manganese and iron by the addition of an acid while stirring and maintaining a pH of 2 to 9, and in the precipitation-recovery procedure of manganese and iron in the solution, maturing the dissolved manganese and iron and then separating and removing insolubles.

In embodiment 5 of the present invention, a method of preparing high-purity manganese compounds comprises adding one or two member of ferromanganese and metallic manganese to an aqueous electrolyte-containing solution, dissolving manganese and iron by the addition of an acid while stirring and maintaining a pH of 2 to 9, and in the precipitation-recovery procedure of manganese and iron in the solution, separating and removing insolubles, and then maturing the dissolved manganese and iron with the addition of precipitant. In embodiment 4, dissolution of manganese and iron is followed by the maturing treatment. The silicic acid content dissolved in the solution is thereby precipitated as a result of gradual polymerization, and can be separated together with insolubles. Moreover, the said maturing treatment increases the filtration rate of the insolubles remarkably. One explanation therefor is that the insolubles are gradually condensed because of the maturing treatment of the aqueous solution to form coarse particles. Thus, the filtering treatment become easier, and that is very advantageous for industrial application.

And the time required for the maturing treatment depends on the permissible Si-content of a desired product, and is preferably from about 3 to about 10 hours. After the maturing treatment the insolubles in the solution are separated and removed. In embodiment 5, manganese and iron are dissolved and extracted in the aqueous solution, and insolubles are separated and removed therefrom, after which the manganese and iron are matured with the addition of a precipitant. Thus, P eluted in the solution is adsorbed by the precipitant and can be easily separated and removed in the form of a precipitate. As the precipitant used here, a small amount of aluminum salt, iron (III) salt, etc. is added which is not dissolved and extracted in the solution. Thus, both impurities Si and P can be removed almost completely. In embodiment 5 the precipitant added in the maturing process is also condensed, and the filtering rate is increased.

As a result of the above-described processes, only manganese and iron are substantially present in a dissolved and extracted state in the aqueous solution. In order to recover manganese and iron from the aqueous solution, the manganese and iron in the aqueous solution are precipitated in the form of for example carbonates. Then manganese compounds with very low impurities contents can be recovered. And by sintering the said carbonates at 800° C., if necessary, high-purity oxides or manganese oxides containing manganese and iron can be easily obtained.

It is not always necessary to recover manganese compounds in the form of carbonates from the solution, if they can be easily precipitated and removed from the solution.

[EXAMPLE 1]

20 g of ferromanganese powder ground to 60 mesh or less was added to 200 ml of 10%-ammonium chloride solution, 6M hydrochloric acid was added while stirring the said solution and maintaining the said solution at a pH of 5 or more, and the manganese and iron in the said ferromanganese powder were dissolved and extracted. When the said solution could not be maintained at a pH of 2 or more, the addition of 6M hydrochloric acid was stopped, and the reaction was terminated. The reaction time was about 3 hours, 106 ml of 6M hydrochloric acid was consumed, and the reaction are (dissolution rate) of manganese and iron in the ferromanganese was bout 90% according to the calculation from the comsumption of hydrochloric acid. After the said solution had been filtered, and insolubles had been separated and removed therefrom, 25 g of hydrogen ammonium carbonate and 4.3 ml of 7.5M aqueous ammonium were added to the said solution, the pH-value of the said solution was raised to 7.8, and the manganese and iron in the solution were precipitated in the form of carbonates. The said precipitated carbonates were filtered, separated and recovered.

In order to determine the purification efficiency of example 1, the recovered carbonates were dried at 110° C., and then were sintered at 800° C. for 90 minutes to form oxides of manganese and iron (mainly $Mn_2O_3$ and $Fe_2O_3$). And the trace impurities contained in the obtained oxides were analyzed. Table 1 shows the results of the analysis compared with those of the analysed trace impurities in the raw ferromanganese.

TABLE 1

| Element | Raw ferromanganese | Resultant oxide |
|---|---|---|
| Mn (%) | 76 | 58 |
| Fe (%) | 19 | 11 |
| P (ppm) | 1400 | 24 |
| Na (ppm) | 31 | 38 |
| Si (ppm) | 2500 | 15 |
| Cr (ppm) | 138 | <1 |
| W (ppm) | 25 | <1 |
| Co (ppm) | 792 | 25 |
| Ni (ppm) | 409 | 1 |
| Mg (ppm) | 21 | 3 |
| Cu (ppm) | 710 | <1 |
| Ca (ppm) | 138 | 56 |
| Al (ppm) | 12 | <1 |
| V (ppm) | 139 | <1 |

[EXAMPLE 2]

150 ml of 12%-aqueous ammonium chloride solution was poured into a reactor, a 2:1 powder mixture of ferromanganese and metallic manganese ground to 60 mesh or less was added gradually into the reactor while stirring the solution, 6M hydrochloric acid was poured gradually into the solution, and then the manganese and iron in the powder were dissolved and extracted. During the dissolution and extraction the added amount of the powder and the poured amount of the 6M hydrochloric acid were adjusted so as to maintain the solution at a pH of 5 or more, and 15 kg of the powder mixture of (10 kg of ferro-manganese and 5 kg of metallic manganese) was treated by dissolution. The time required for the dissolution treatment was about 10 hours, and the consumption of 6M hydrochloric acid was 78 lit. The treated solution was allowed to stand for 12 hours, after which it was filtered, and insolubles were separated and removed. Moreover, 17 kg of hydrogen ammonium carbonate and 26 lit. of 5M aqueous ammonia were added to the solution, and the solution was allowed to stand for about one hour, after which the manganese carbonate and carbonate formed as a result of precipitation were filtered, separated and recovered. The dry weight of the products was 23.7 kg.

Some of the formed carbonate was sintered in the same manner as in embodiment 1, and was analyzed in the form of oxide. Table 2 shows the results of the analysis.

TABLE 2

| Element | Raw material (ferromanganese + metallic manganese) | Resultant oxide |
|---|---|---|
| Mn (%) | 93.7 | 61.0 |
| Fe (%) | 5 | 7 |
| P (ppm) | 980 | 42 |
| Na (ppm) | 85 | 50 |
| V (ppm) | 95 | <1 |
| Cr (ppm) | 142 | <1 |
| Cu (ppm) | 650 | <1 |
| Co (ppm) | 820 | 40 |
| Ni (ppm) | 510 | <1 |
| Si (ppm) | 7030 | 49 |

From Table 2 it is obvious that heavy metals such as Co, Cr, Ni, etc. as well as non-metals such as P, Si, etc. have decreased remarkably.

[EXAMPLE 3]

20 g of ferromanganese powder (60 mesh or less) was added to 200 ml of 15%-ammonium nitrate solution 7M HNO$_3$ was added gradually thereto while stirring and maintaining the said solution at a pH of 5 or less, and manganese and iron were extracted by dissolution. When the pH-value of the said solution exceeds 5 and the addition of 7M HNO$_3$ became impossible, the reaction was terminated.

The consumption the 7M HNO$_3$ was 84 ml, and the time till the end of the reaction was about 2 hours. Then the insolubles in the said solution were separated by filtration, and 22 g of hydrogen ammonium carbonate and 38 ml of aqueous ammonia were added to the filtrate followed by adjusting the pH-value of the solution to 7.6. And the manganese in the solution was precipitated, separated by filtration and recovered. The iron in the solution was oxidized by nitrate and nitric acid, and was separated by filtration in the form of the said insolubles.

In order to determine the purification efficiency of Example 3, the recovered carbonate was dried at 110° C., and then was sintered at 800° C. for 90 minutes. Table 3 shows the composition of the obtained manganese oxide compared with that of the raw ferromanganese.

When nitric acid was used as in Table 3, not only trace impurities but also iron could be separated and removed at a high precentage.

TABLE 3

| Element | Raw ferromanganese | Resultant oxide |
|---|---|---|
| Mn (%) | 80.5 | 67.6 |
| Fe (%) | 16.5 | 0.03 |
| P (ppm) | 1440 | <1 |
| Si (ppm) | 15000 | 10 |
| Cr (ppm) | 170 | <1 |
| Co (ppm) | 720 | 27 |
| Ni (ppm) | 400 | <1 |
| Cu (ppm) | 500 | <1 |
| Ca (ppm) | 129 | 85 |

TABLE 3-continued

| Element | Raw ferromanganese | Resultant oxide |
|---|---|---|
| V (ppm) | 230 | <1 |

[EXAMPLE 4]

20 g of metallic manganese ground to 60 mesh or less was added to 15%-ammonium acetate solution, 7.5M acetic acid was added with stirring, and manganese was extracted by dissolution at a pH of 5 or more. The consumption of the 7.5M acetic acid was 95 ml, and the time required for the extraction was about 4 hours. Then the insolubles in the said solution were separated by filtration, and 28 g of hydrogen ammonium carbonate and 48 ml of 7.5M aqueous ammonia were added to the filtrate followed by adjusting the pH-value of the solution to 7.2. And the manganese in the solution was precipitated, separated by filtration and recovered in the form of carbonate.

In order to determine the prufication efficiency of example 4, the said carbonate was dried at 110° C. and then sintered at 800° C. for 90 minutes. Table 4 shows of the impurities contents and Mn-contents of the raw metallic manganese and the resultant oxide.

TABLE 4

| Element | Raw metallic manganese | Resultant oxide |
|---|---|---|
| Mn (%) | >99 | 68.3 |
| P (ppm) | 21 | <10 |
| Na (ppm) | 15 | 11 |
| V (ppm) | 14 | <1 |
| Cr (ppm) | 51 | <1 |
| Cu (ppm) | 11 | <1 |
| Co (ppm) | 39 | 5 |
| Ni (ppm) | 69 | <1 |
| Si (ppm) | 210 | 10 |
| Fe (ppm) | 160 | 5 |

[EXAMPLE 5]

15 g of ferromanganese powder ground to 60 mesh or less was added to 150 ml of 10%-ammonium chloride solution, and 6M hydrochloric acid was added gradually while stirring the said solution to dissolve and extract manganese and iron in the ferromanganese.

As a result of the addition of 6M hydrochloric acid, the pH of the said solution dropped gradually from 8.5. When the pH reached the predetermined value, the addition of 6M hydrochloric acid was stopped, and the reaction was terminated. In order to inspect the influences of the extraction on the contents of the trace elements in the end-product, the said solution was maintained at 10° to 90° C. by a thermostat and subjected to reaction. The reaction time was about 3 hours, 76 to 80 ml of 6M hydrochloric acid was consumed, and the reaction rate (dissolution rate) of manganese and iron in the ferromanganese was about 88 to 92% according to the calculation from the said consumption of hydrochloric acid.

Figure 5:
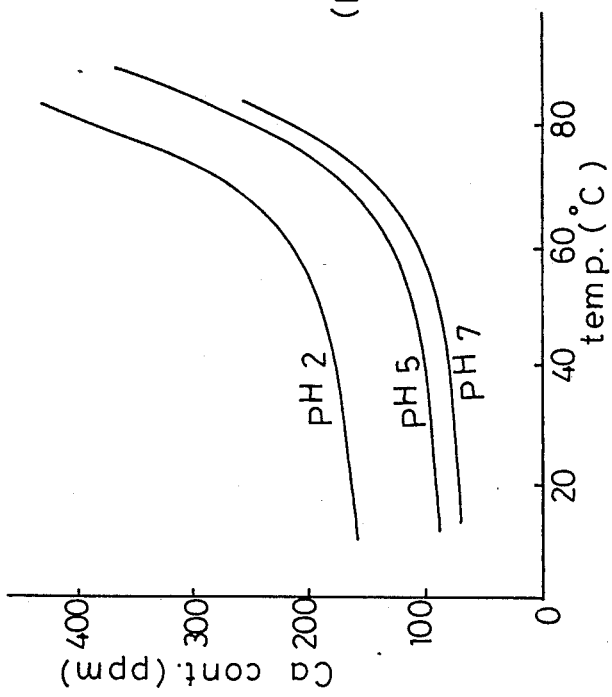
FIG. 5 shows graphically the relationship of the Ca-content to temperature.

The said solution was filtered, and insolubles were separated and removed therefrom, after which 22 g of ammonium carbonate was added to the said solution followed by adding aqueous ammonium to adjust the pH of the said solution to 7.8. The manganese in the said solution was precipitated in the form of carbonate, and the said carbonate was separated by filtration and recovered. In order to determine the purification efficiency of Example 5, the recovered carbonate was dried at 110° C. and then sintered at 800° C. for 90 minutes, thus to obtain manganese oxides (mainly $Nm_2O_3$) and to analyze Co and Ca therein. As FIGS. 4 and 5 show, the elution amounts of both Co and Ca become greater, and the purification efficiency drops, when the termperature exceeds 60° C. At a temperature of 60° C. or below the removal rates of Co and Ca very little and remain stable.

[EXAMPLE 6]

15 g of ferromanganese powder ground to 60 mesh or less was added to 150 ml of 15%-ammonium chloride solution, and about 1 lit. of air was blown every minute through a teflon tube inserted into the solution while stirring the solution folowed by the gradual addition of 6M hydrochloric acid to dissolve and extract manganese and iron in the ferromanganese. The temperature was then maintained within a range of 20° to 60° C.

As a result of the addition of 6M hydrochloric acid, the pH of the solution dropped gradually from 8.5. When the pH reached 5, the addition of 6M hydrochloric acid was stopped, and the reaction was terminated. Then iron was once extracted and dissolved, oxidized by air to iron (III) hydroxide and precipitated. The reaction time was about 2 hours, 72 ml of 6M hydrochloric acid was consumed, and the reaction rate (dissolution rate) of manganese in the ferromanganese was 99% according to the calculation from the consumption.

The solution was filtered, and insolubles were separated and removed therefrom, after which 22 g of ammonium carbonate was added to the solution followed by adding aqueous ammonium to adjust the pH of the solution of 7.8. The manganese in the said solution was precipitated in the form of carbonate, and the carbonate was separated by filtration and recovered.

In order to determine the purification efficiency of Example 6, the recovered carbonate was dried at 110° C. and then sintered at 800° C. for 90 minutes, thus to obtain manganese oxides (mainly $Mn_2O_3$) and to analyze P, Si, Cr, Al, Vi and Fe. For comparison Table 5 shows the results of the analysis in combination with those of the analyzed dissoltion without air blowing.

TABLE 5

| Impurities element | Raw ferromanganese | Sintered oxide Without air introduction | Sintered oxide With air introduction |
| --- | --- | --- | --- |
| P (ppm) | 1380 | 90 | 2 |
| Si (ppm) | 4800 | 15 | 8 |
| Cr (ppm) | 218 | 5 | <1 |
| Al (ppm) | 200 | 3 | <1 |
| V (ppm) | 177 | 1 | <1 |
| Fe (%) | 16.7 | 9.7 | <0.1 |

[EXAMPLE 7]

15 g of ferromanganese powder ground to 60 mesh or less was added to 150 ml of 10%-ammonium chloride solution, and 6M hydrochloric acid was added gradually while stirring the said solution to dissolve and extract manganese and iron in the ferromanganese.

Figure 6:
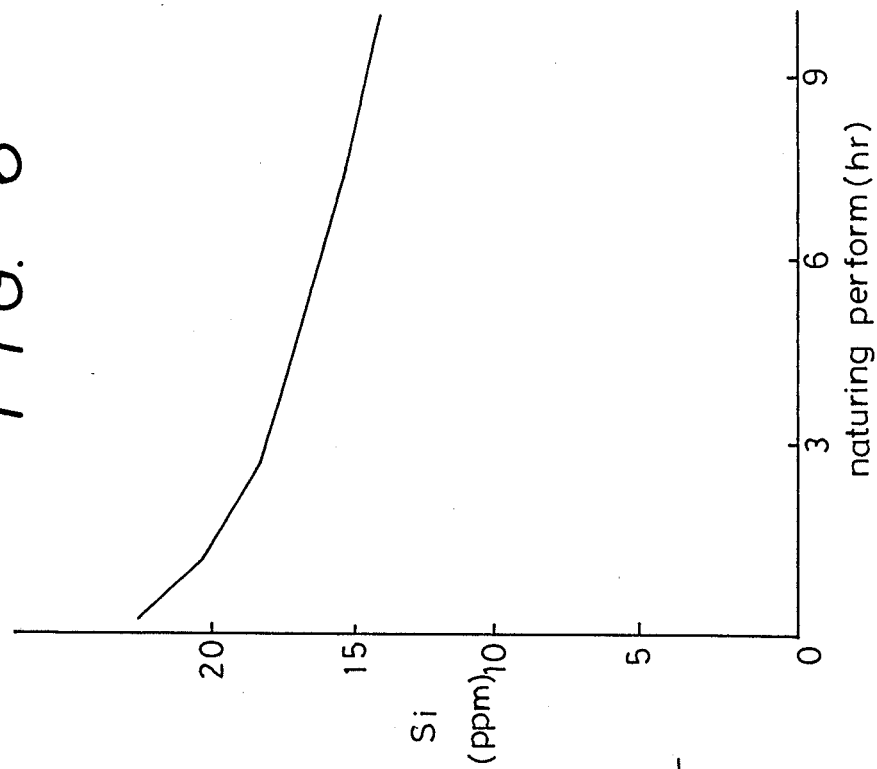
FIG. 6 shows graphically the relationship of the Si-content in the solution to the maturing time.

As a result of the addition of 6M hydrochloric acid, the pH of the solution dropped gradually from 8.5. When the pH reached 5, and addition of 6M hydrochloric acid was stopped, and the reaction was terminated. Thereafter, the solution (including insolubles) was poured in another container and matured for 10 hours. In order to observe changes on standing, samples are taken suitably from the solution, and the Si-content thereof was analyzed. FIG. 6 shows the results of the analysis. From FIG. 6 it is obvious that the Si in the solution increases as the maturing time goes by, and that the maturing treatment is effective for removal of Si. Table 6 compares the filtration rate of the first embodiment with that of the invention without maturing treatment.

TABLE 6

| | Filtering rate ($m^3/m^2H$) |
| --- | --- |
| First invention | 0.05 to 0.1 |
| Without maturing treatment | 0.01 |

(Note) Filtered with filter press

It can be seen from Table 6 that the filtration rate in Embodiment 4 is much higher than that without maturing treatment, so that the filtering time can be shortened.

[EXAMPLE 8]

In the same manner as in Embodiment 4, manganese and iron were dissolved and extracted in a 10%-ammonium chloride solution followed by filtering and separating insolubles from the solution. 500 ml of 10%-iron (II) chloride was then added to the said solution, and they were mixed together. The resultant mixture was matured for 10 hours. It was then analyzed to determine its P- and Si-contents. For comparison Table 7 shows the results of the analysis in combination with those without maturing treatment.

TABLE 7

| Impurities element | Present invention | Without maturing treatment |
| --- | --- | --- |
| P (ppm) | 1.5 | 45 |
| Si (ppm) | 13 | 25 |

As described above, according to the present invention, wherein ferromanganese and metallic manganese are added to an aqueous electrolytic solution, the pH of the solution is adjusted to 2 to 9 by the addition of an acid, and then manganese and iron are dissolved, extracted and recovered, the removal rates of impurities, in particular those of Si and P, can be raised by maturing the solution which has dissolved manganese and iron, or by maturing it with the addition of a participant after the separation and removal of insolubles.

Moreover, the maturing treatment enables insolubles to be condensed, thus enhancing the filtering treatment thereof.

What is claimed is:

1. A method of preparing manganese compounds suitable as raw materials for ferrites, comprising adding at least one member selected from ferromanganeses and metallic manganeses to an aqueous buffered solution containing an electrolyte, dissolving said at least one member by the addition of an acid thereto while stirring and maintaining a pH 4 to 9 such that manganese is dissolved without substantial co-dissolution of an impurity selected from the group consisting of cobalt, calcium, chromium, magnesium, silicon, nickel, phosphorus, copper, and vanvadium, filtering said aqueous buffered solution to form a filtered aqueous solution, and then precipitating said manganese from said filtered aqueous solution.

2. The method of perparing manganese compounds as claimed in claim 1, wherein said electrolyte is an ammonium compound.

3. The method of preparing manganese compounds as claimed in claim 2, wherein said ammonium compound is ammonium chloride or ammonium nitrate.

4. The method of preparing manganese compounds as claimed in claim 1, wherein said electrolyte is a salt of alkali metals.

5. The method of preparing manganese compounds as claimed in claim 1, wherein said acid is a member selected from the group consisting of hydrochloric acid, sulfuric acid, nitric acid, and acetic acid.

6. The method of preparing manganese compounds as claimed in claim 1, wherein said method comprises dissolving said at least one member by the addition of an acid while maintaining the said aqueous buffered solution at a temperature of 20° to 60° C.

7. The method of preparing manganese compounds as claimed in claim 1, wherein the said method comprises dissolving said at least one member by addition of an acid while blowing air into said aqueous buffered solution.

8. A method of preparing manganese compounds suitable as raw materials for ferrites, comprising adding at least one member from ferromanganeses and metallic manganeses to an aqueous buffered solution containing an electrolyte, dissolving said at least one member by the additon of an acid thereto while stirring and maintaining a pH of 4 to 9 such that manganese is dissolved without substantial co-dissolution of an impurity selected from the group consisting of cobalt, calcium, chromium magnesium, solicon, nickel, phosphorus, copper and vanadium, then performing a maturing treatment by permitting the solution to stand for at least 3 hours, filtering said aqueous buffered solution to form a filtered aqueous solution, and then precipitating said manganese from said filtered aqueous solution.

9. The method of preparing manganese compounds as claimed in claim 8, wherein said electrolyte is an ammonium compound.

10. The method of preparing manganese compounds as claimed in claim 9, wherein said ammonium compound is ammonium chloride or ammonium nitrate.

11. The method of preparing manganese compounds as claimed in claim 8, wherein said electrolyte is a salt of alkali metals.

12. The method of preparing manganese compounds as claimed in claim 8, wherein said acid is member selected from the group consisting of hydrochloric acid, sulfuric acid, nitric acid, and acetic acid.

13. The method of preparing manganese compounds as claimed in claim 8, wherein said method comprises dissolving said at least one member by the addition of an acid while maintaining said aqueous buffered solution at a temperature of 20° to 60° C.

14. The method of preparing manganese compounds as claimed in claim 8, wherein said method comprises dissolving said at least one member by addition of an acid while blowing air into said aqueous buffered solution.

15. A method of preparing manganese compounds suitable as raw materials for ferrites, comprising adding at least one member selected from ferromanganeses and metallic manganeses to an aqueous buffered solution containing an electrolyte, dissolving said at least one member by the addition of an acid thereto while stirring and maintaining a pH of 4 to 9 such that manganese is dissolved without substantial co-dissolution of an impurity selected from the group consisting of cobalt, calcium, chromium, mangesium, silicon, nickel, phophorus, copper and vanadium then performing a maturing treatment by the addition of a precipitant and permitting the solution to stand for at least 3 hours, filtering said aqueous buffered solution to form a filtered aqueous solution and then precipitating said manganese from said filtered aqueous solution.

16. The method of preparing manganese compounds as claimed in claim 15, wherein said electrolyte is an ammonium compound.

17. The method of preparing manganese compounds as claimed in claim 16, wherein said ammonium compound is ammonium chloride or ammonium nitrate.

18. The method of preparing manganese compounds as claimed in claim 15, where said electrolyte is a salt of alkali metals.

19. The method of preparing manganese compounds as claimed in claim 15, wherein said acid is one member selected from the group consisting of hyrochloric acid, sulfuric acid, nitric acid, and acetic acid, 20. The method of preparing manganese compounds as claimed in claim 15, wherein said method comprises dissolving said at least one member by the addition of an acid while maintaining said aqueous buffered solution at a temperature of 20° to 60° C.

21. The method of preparing manganese compounds as claimed in claim 15, wherein said method comprises dissolving said at least one member by addition of an acid while blowing air into said aqueous buffered solution.

22. The method of claim 1 wherein the addition of said at least one member to said aqueous buffered solution results in an initial pH of at least 7.8.

* * * * *